(12) United States Patent
Yoshida et al.

(10) Patent No.: US 12,335,656 B2
(45) Date of Patent: Jun. 17, 2025

(54) IMAGE REPRODUCTION APPARATUS, CONTROL METHOD THEREOF, AND STORAGE MEDIUM

(71) Applicant: CANON KABUSHIKI KAISHA, Tokyo (JP)

(72) Inventors: Koji Yoshida, Kanagawa (JP); Yuki Kurosawa, Tokyo (JP); Tomoaki Takahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 18/326,307

(22) Filed: May 31, 2023

(65) Prior Publication Data

US 2023/0396731 A1  Dec. 7, 2023

(30) Foreign Application Priority Data

Jun. 2, 2022 (JP) .................................. 2022-090383
Jun. 7, 2022 (JP) .................................. 2022-092394

(51) Int. Cl.
*H04N 5/91* (2006.01)
*H04N 5/77* (2006.01)
*H04N 23/63* (2023.01)

(52) U.S. Cl.
CPC ................. *H04N 5/91* (2013.01); *H04N 5/77* (2013.01); *H04N 23/63* (2023.01)

(58) Field of Classification Search
CPC ............. H04N 5/91; H04N 23/63; H04N 5/77
USPC ...................................................... 348/231.2
See application file for complete search history.

(56) References Cited

U.S. PATENT DOCUMENTS 9,002,059 B2 * 4/2015 Fujitani .................. G06F 16/58
382/103

FOREIGN PATENT DOCUMENTS

JP  2008-072499 A  3/2008

\* cited by examiner

*Primary Examiner* — Joel W Fosselman
(74) *Attorney, Agent, or Firm* — Cowan, Liebowitz & Latman, P.C.

(57) ABSTRACT

An image reproduction apparatus includes a setting unit configured to set, when reproduction of an image stored in a storage unit is performed, whether to perform filtering reproduction that reproduces the image by performing filtering in which only images that match specific attribute information are selected, or to perform reproduction without performing filtering; and a control unit configured to control reproduction of images stored in the storage unit based on the setting by the setting unit. The control unit performs display for calling the attention of a user when an image that does not match the specific attribute information is included in images being added to the storage unit before performing the filtering reproduction.

21 Claims, 7 Drawing Sheets

IMAGE REPRODUCTION APPARATUS, CONTROL METHOD THEREOF, AND STORAGE MEDIUM

BACKGROUND OF THE INVENTION

Field of the Invention

The present invention relates to an image reproduction apparatus that can reproduce images.

Description of the Related Art

Conventionally, image reproduction apparatuses that reproduce and display images captured by an image capturing apparatus include those that can filter and reproduce the images associated with specific attribute information.

Japanese Patent Laid-Open No. 2008-72499 discloses an image reproduction apparatus that can filter and reproduce the images associated with specific attribute information such as image captured date. Furthermore, the image reproduction apparatus, which is built into an image capturing apparatus, cancels the ON state of the filtering reproduction mode when the image capturing is performed in a state where the filtering reproduction mode is ON. This is because when the ON state of the filtering reproduction mode continues after the image capturing, a user cannot be aware that images that do not match filtering condition are increased, in case where such images are increased.

However, the conventional technique disclosed in the aforementioned Japanese Patent Laid-Open No. 2008-72499 has poor usability such that the user needs to reset the filtering reproduction mode to ON each time the user captures an image, in a case where the user wants to keep the filtering reproduction mode ON after image capturing.

SUMMARY OF THE INVENTION

The present invention has been made in light of the foregoing problems and provides an image reproduction apparatus that allows the user to be aware of an increase of the number of images while filtering the images to be reproduced.

According to a first aspect of the present invention, there is provided an image reproduction apparatus comprising: at least one processor or circuit configured to function as a setting unit configured to set, when reproduction of an image stored in a storage unit is performed, whether to perform filtering reproduction that reproduces the image by performing filtering in which only images that match specific attribute information are selected, or to perform reproduction without performing filtering; and a control unit configured to control reproduction of images stored in the storage unit based on the setting by the setting unit, wherein the control unit performs display for calling the attention of a user when an image that does not match the specific attribute information is included in images being added to the storage unit before performing the filtering reproduction.

According to a second aspect of the present invention, there is provided a method for controlling an image reproduction apparatus including a setting unit configured to set, when reproduction of an image stored in a storage device is performed, whether to perform filtering reproduction that reproduces the image by performing filtering in which only images that match specific attribute information are selected, or to perform reproduction without performing filtering, the method comprising: controlling reproduction of an image stored in the storage device based on the setting set by the setting unit, wherein the controlling performs display for calling the attention of a user when an image that does not match the specific attribute information is included in images being added to the storage unit before the filtering reproduction is performed.

Further features of the present invention will become apparent from the following description of exemplary embodiments with reference to the attached drawings.

DESCRIPTION OF THE EMBODIMENTS

Figure 1:
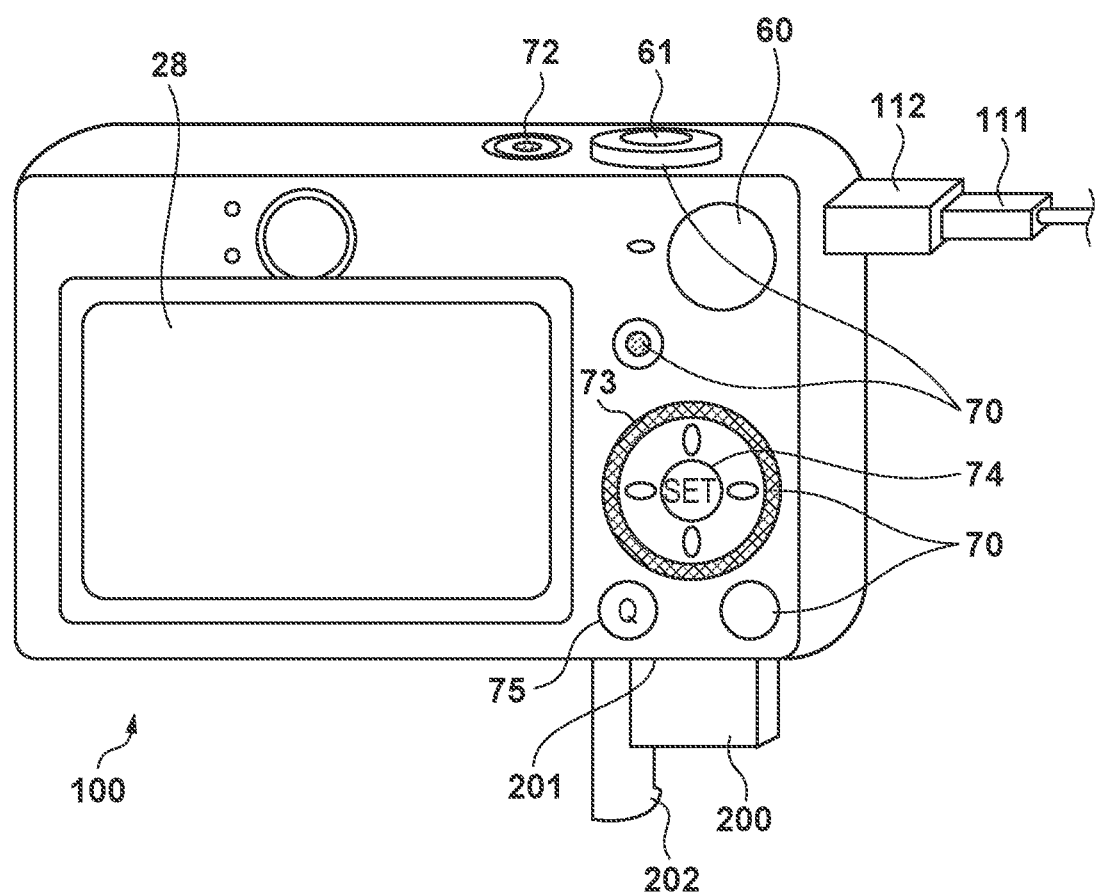
FIG. 1 is a diagram illustrating an outer appearance of a digital camera, which is an embodiment of the image reproduction apparatus according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram illustrating an outer appearance of a digital camera 100, which is an embodiment of the image reproduction apparatus according to the present invention;

In FIG. 1, a display unit 28 is a display unit disposed at the back side of the digital camera 100 and configured to display images and various information. A shutter button 61 is an operation unit configured to provide an image capturing instruction. A mode selection switch 60 is an operation unit configured to switch between various modes. A connector 112 is a connector between the digital camera 100 and a connection cable 111 that is configured to connect external devices such as a personal computer or a printer. An operation unit 70 includes operation members such as various switches, buttons, and touch panels that accept various operations from the user. A controller wheel 73 is a rotatable operation member included in the operation unit 70.

A power switch 72 is a push button configured to switch on and off the power supply. A recording medium 200 is a recording medium such as a memory card or a hard disk. A recording medium slot 201 is a slot for containing the recording medium 200. The recording medium 200 contained in the recording medium slot 201 can communicate with the digital camera 100 and thus recording and reproducing can be performed. A lid 202 is a lid of the recording medium slot 201. FIG. 1 illustrates a state where the lid 202 is open and a part of the recording medium 200 is taken out from the slot 201 and exposed. In addition, the recording medium slot 201 can also contain a plurality of recording media 200. When a plurality of recording media 200 are contained, a system control unit 50 can use one of the recording media 200 in a prioritized manner, and the selection of the prioritized recording medium 200 can be switched.

Figure 2:
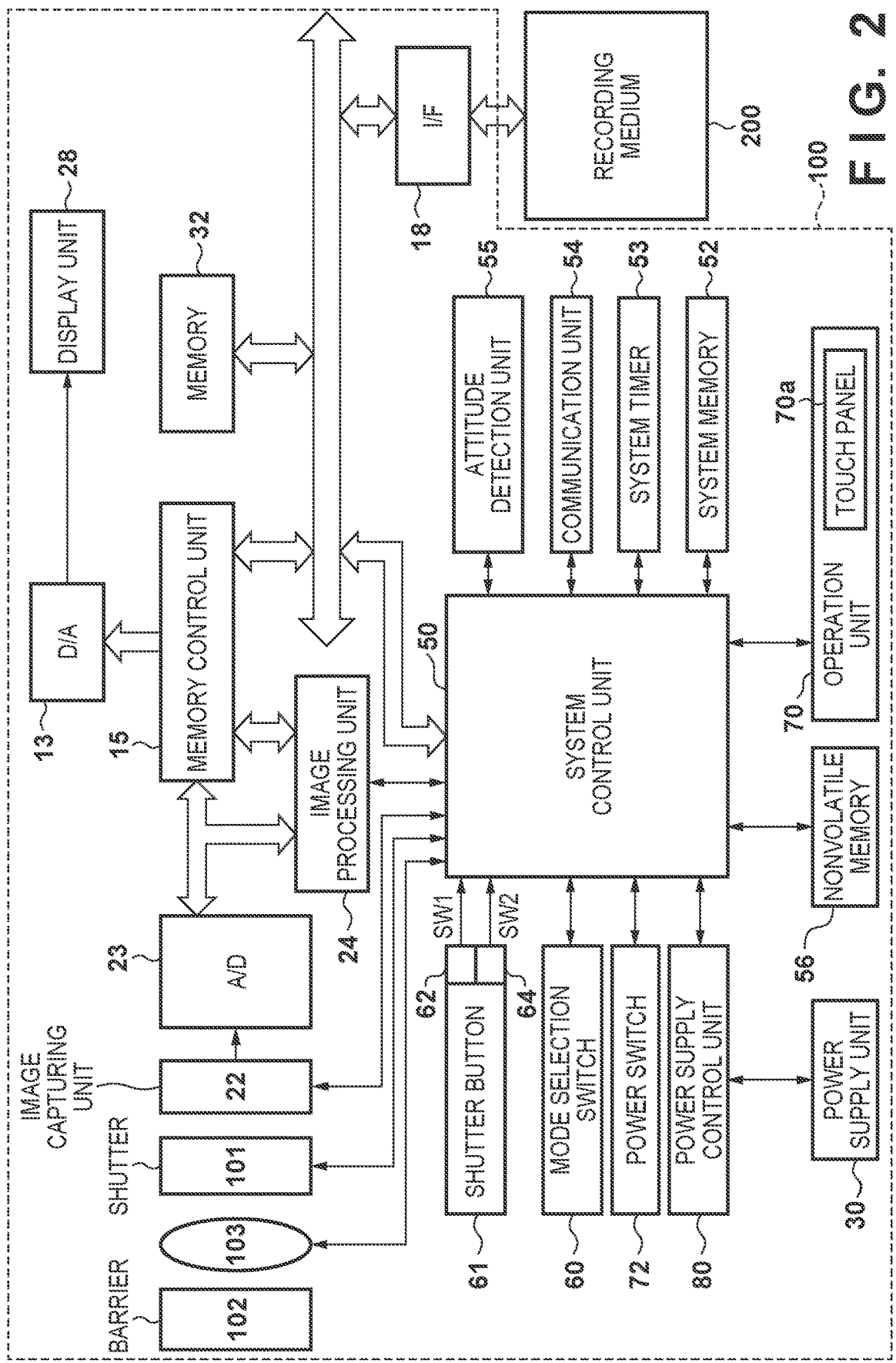
FIG. 2 is a block diagram illustrating an example configuration of a digital camera according to an embodiment.

FIG. 2 is a block diagram of an example configuration of the digital camera 100 according to the present embodiment. In FIG. 2, an image capturing lens 103 is a lens group including a zoom lens and a focus lens. A shutter 101 is a shutter having an aperture function. An image capturing unit 22 includes an image capturing element (image sensor) including a CCD or CMOS element that convert an optical image into an electrical signal. An A/D converter 23 converts an analog signal output from the image capturing unit 22 into a digital signal. A barrier 102 covers the image capturing system of the digital camera 100 including the image capturing lens 103 to prevent contamination and breakage of the image capturing system including the image capturing lens 103, the shutter 101, and the image capturing unit 22.

An image processing unit 24 performs a resizing process such as predetermined pixel interpolation or reduction, or a color conversion process on the data from the A/D converter 23 or the data from the memory control unit 15. In addition, the image processing unit 24 performs a predetermined calculation process using the captured image data. The system control unit 50 performs exposure control and ranging control, based on the calculation result obtained by the image processing unit 24. Accordingly, through-the-lens (TTL) method auto focus (AF) processing, auto exposure (AE) processing, and flash pre-emission (EF) processing are performed. The image processing unit 24 further performs predetermined calculation processing using the captured image data, and performs TTL-method auto white balance (AWB) processing based on the obtained calculation result.

The output data from the A/D converter 23 is directly written to a memory 32, via the image processing unit 24 and the memory control unit 15, or via the memory control unit 15. The memory 32 stores image data obtained by the image capturing unit 22 and converted into digital data by the A/D converter 23, or image data to be displayed on the display unit 28. The memory 32 has sufficient storage capacity for storing a predetermined number of still images, a moving image and sound of a predetermined duration.

The memory 32 also serves as a memory (video memory) for image display. A D/A converter 13 converts data for image display stored in the memory 32 into an analog signal and supplies the analog signal to the display unit 28. The image data for display written to the memory 32 is thus converted into analog signals by the D/A converter 13 and subsequently displayed by the display unit 28. An electronic viewfinder can be realized such that the digital signal that has been once A/D-converted by the A/D converter 23 and accumulated in the memory 32 is converted into analog signal by the D/A converter 13, and the analog signal is sequentially transferred to the display unit 28 and displayed. In this way, through-image display (live-view display (LV display)) can be performed. In the following, an image displayed by live-view will be referred to as an LV image.

A nonvolatile memory 56 is a memory such as an EEPROM, for example, serving as a recording medium that is electrically erasable and recordable. The nonvolatile memory 56 stores constants, programs, and the like, for operating the system control unit 50. The programs mentioned here refer to computer programs for executing various flowcharts described below in the present embodiment.

The system control unit 50, which is a control unit including at least one processor and/or at least one circuit, controls the entire camera 100. Execution of the programs recorded in the aforementioned nonvolatile memory 56 realizes each process according to the present embodiment described below. A RAM is employed as a system memory 52, for example. In the system memory 52, constants, variables, and programs read from the nonvolatile memory 56 and the like for operating the system control unit 50 are deployed. In addition, the system control unit 50 also performs display control by controlling the memory 32, the D/A converter 13, the display unit 28, and the like.

A system timer 53 is a clock unit that measures a time used for various controls and a time of a built-in clock.

The mode selection switch 60, the shutter button 61, and the operation unit 70 are operating units configured to input various operation instructions to the system control unit 50. The mode selection switch 60 switches the operation mode of the system control unit 50 to one of a still image recording mode, a video capturing mode, a reproduction mode and the like. The modes included in the still image recording mode are an auto mode, an auto scene mode, a manual mode, an aperture priority mode (Av mode), a shutter-speed prioritized mode (Tv mode), and a program AE mode. There are various scene modes, custom modes, and the like, which are image capturing settings for each image capturing scene. The user can switch directly to any of the modes by operating the mode selection switch 60. Alternatively, the user may temporarily switch to a screen listing the image capturing modes using the mode selection switch 60, and subsequently the user may use another operation member to select and switch to one of the plurality of modes being displayed. Similarly, the video capturing mode may also include a plurality of modes.

A first shutter switch 62 is turned ON by operating halfway, or so-called half-pressing (image capturing preparation instruction), the shutter button 61 provided to the digital camera 100, thereby a first shutter switch signal SW1 is generated. The first shutter switch signal SW1 starts operations of processing such as auto focus (AF) processing, auto exposure (AE) processing, auto white balance (AWB) processing, flash pre-emission (EF) processing, and the like.

A second shutter switch 64 is turned ON when the operation of the shutter button 61 is completed that is so-called full-press (image capturing instruction), thereby a second shutter switch signal SW2 is generated. In response to the second shutter switch signal SW2, the system control unit 50 starts a sequence of operations of image capturing processing from reading a signal from the image capturing unit 22 to writing image data to the recording medium 200.

By selecting and operating various function icons displayed on the display unit 28, functions are appropriately assigned for respective operation members of the operation unit 70 for each scene, and the operation members act as various function buttons. The function buttons include, for example, an end button, a return button, an image feeding button, a jump button, a filter button, an attribute change button, and the like. For instance, when a menu button is pressed, a menu screen on which various settings can be performed is displayed on the display unit 28. The user can intuitively make various settings using a menu screen displayed on the display unit 28, a four-direction (up, down, left and right) button, and a SET button. In addition, the operation unit 70 also includes a touch panel 70a disposed at the surface of the display unit 28.

The controller wheel 73 is a rotatable operation member included in the operation unit 70, and is used together with the direction button to instruct a selection item. When the controller wheel 73 is performed with rotation operation, an electrical pulse signal is generated in accordance with the amount of operation, and the system control unit 50 controls respective parts of the digital camera 100 based on the pulse signal. The angle and the number of rotations of rotation operation of the controller wheel 73 can be determined according to the pulse signal. Here, the controller wheel 73 may be any operation member that can detect rotation operation. For example, the controller wheel 73 itself may be a dial operation member that rotates and generates a pulse signal in response to the user's rotation operation. Alternatively, the controller wheel 73 may also be an operation member including a touch sensor (so-called "touch wheel") that does not itself rotate but detects a rotation operation of the user's finger on the controller wheel 73.

A power supply control unit 80 includes a battery detection circuit, a DC-DC converter, a switch circuit configured to switch a block to be energized, and the like, and detects whether a battery is mounted, the type of the battery, and a remaining battery level. In addition, the power supply control unit 80 controls the DC-DC converter based on the detection result and an instruction from the system control unit 50, and supplies a required voltage to each unit including the recording medium 200 for a required period. The power supply unit 30 includes a primary battery such as an alkaline battery or a lithium battery, a secondary battery such as an NiCd battery, an NilVH battery or an Li-ion battery, and an AC adapter.

A recording medium OF 18 is an interface with the recording medium 200 such as a memory card or a hard disk. The recording medium 200 is a recording medium such as a memory card configured to record captured images, and includes a semiconductor memory, an optical disk, a magnetic disk, and the like.

A communication unit 54 is connected to external devices wirelessly or via a wired cable to transmit and receive video signals and sound signals. The communication unit 54 can also be connected to a wireless Local Area Network (LAN) or the Internet. In addition, the communication unit 54 can also communicate with external devices via Bluetooth (trade name) or Bluetooth Low Energy. The communication unit 54, which can transmit an image captured by the image capturing unit 22 (including a live image), and an image recorded in the recording medium 200, and receive image data or other various types of information from an external device.

An attitude detection unit 55 detects the attitude of the digital camera 100 relative to the direction of gravity. Based on the attitude detected by the attitude detection unit 55, it is possible to determine whether an image captured by the image capturing unit 22 is captured with the digital camera 100 held horizontally or captured with the digital camera 100 held vertically. The system control unit 50 can add orientation information corresponding to the attitude detected by the attitude detection unit 55 to an image file of the image captured by the image capturing unit 22, record the image in a rotated manner, or the like. An acceleration sensor, a gyro sensor, and the like can be used as the attitude detection unit 55. It is also possible to detect a motion of the camera 100 (whether or not panned, tilted, lifted, stationary, etc.) using the acceleration sensor or the gyro sensor disposed at the attitude detection unit 55.

Figure 3A:
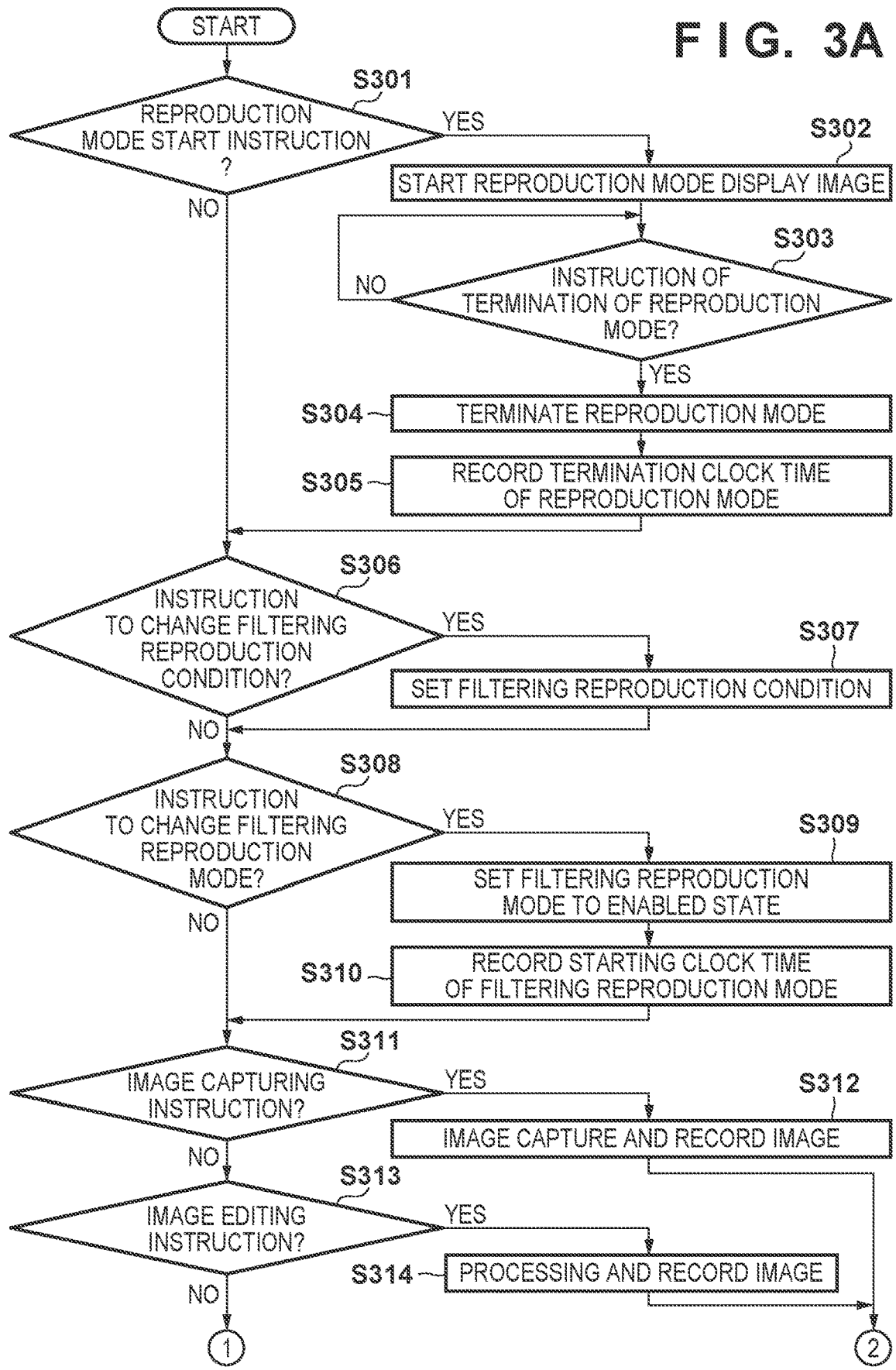
FIGS. 3A and 3B are flowcharts illustrating a procedure of an image capturing operation and a reproduction operation in an embodiment.
Figure 3B:
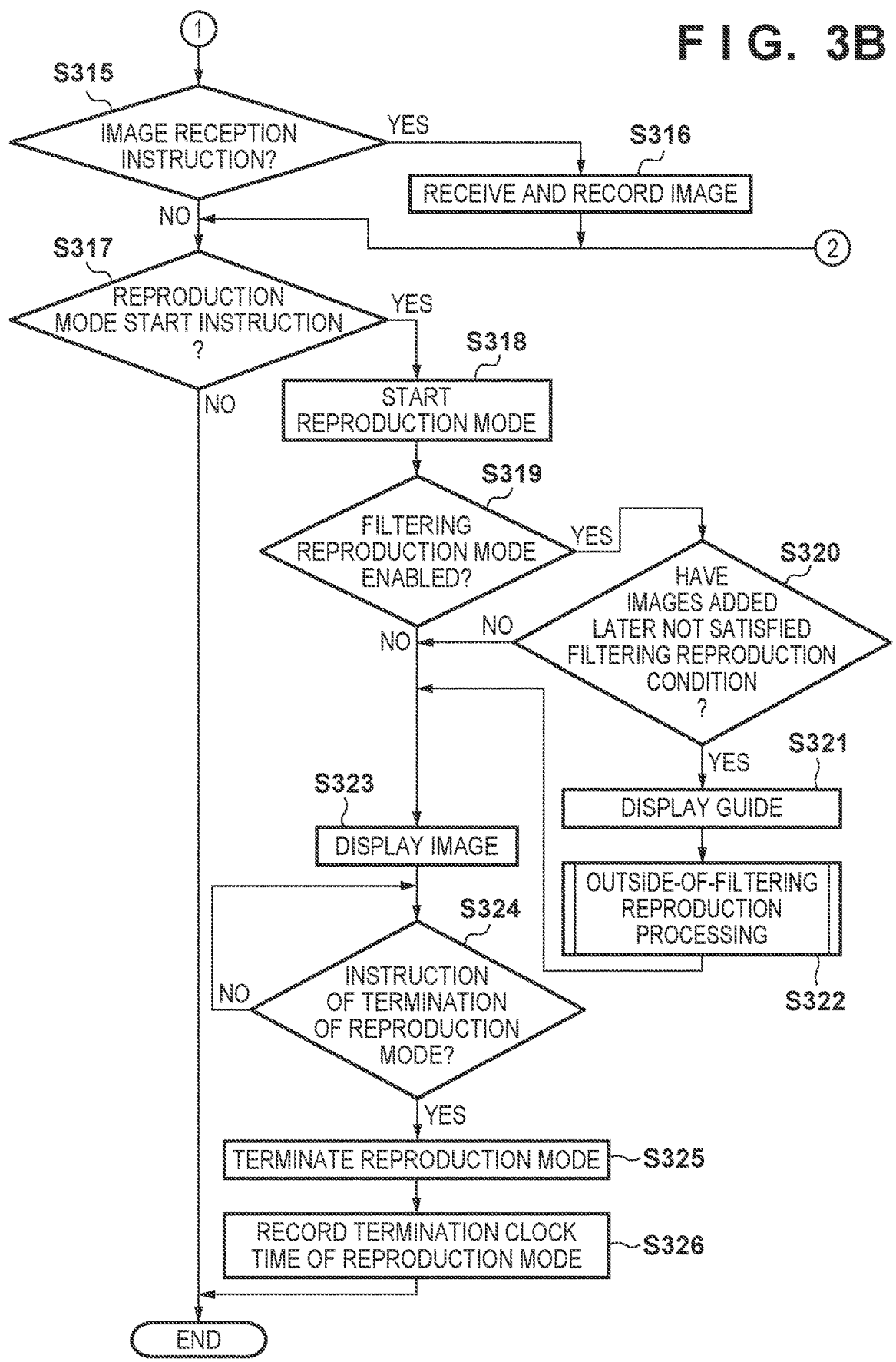

Next, FIGS. 3A and 3B are flowcharts illustrating a procedure of an image capturing operation and a reproduction operation according to the present embodiment. In the following, the image capturing operation and the reproduction operation according to the present embodiment will be described, referring to FIGS. 3A and 3B. The operations of the flowcharts illustrated in FIGS. 3A and 3B are realized by the system control unit 50 deploying the control program stored in the nonvolatile memory 56 to the system memory 52 and executing the deployed program.

In displaying images in the reproduction mode, the digital camera 100 has a filtering reproduction function that can filter the images to the images that are associated with specific attribute information such as image captured date. The filtering reproduction function operates when the filtering reproduction mode is ON, and does not operate when the filtering reproduction mode is OFF. The term "does not operate" means that images to be displayed in the reproduction mode are not filtered. The setting of the filtering reproduction mode is stored in the memory 32.

The filtering reproduction mode recorded in the memory 32 is assumed to be OFF at the start of operation of the flowcharts illustrated in FIGS. 3A and 3B.

At step S301, the system control unit 50 determines whether or not the operation unit 70 has instructed to start the reproduction mode. When the reproduction mode is instructed to start, the system control unit 50 advances the process to step S302, or when the reproduction mode is not instructed to start, the system control unit 50 advances the process to step S306.

At step S302, the system control unit 50 starts the reproduction mode and displays, on the display unit 28, the latest image data among the image data recorded in the recording medium 200.

At step S303, the system control unit 50 determines whether or not the operation unit 70 has instructed to terminate the reproduction mode. When the reproduction mode is instructed to be terminated, the system control unit 50 advances the process to step S304, or when the reproduction mode is not instructed to be terminated, the system control unit 50 keeps waiting.

At step S304, the system control unit 50 terminates the reproduction mode and terminates the operation of displaying, on the display unit 28, the image data recorded in the recording medium 200.

At step S305, the system control unit 50 acquires from the system timer 53 and records in the memory 32 the clock time at which the reproduction mode is terminated.

At step S306, the system control unit 50 determines whether or not the operation unit 70 has instructed to change the filtering reproduction condition. When the filtering reproduction condition is instructed to be changed, the system control unit 50 advances the process to step S307, or when the filtering reproduction condition is not instructed to be changed, the system control unit 50 advances the process to step S308.

At step S307, the system control unit 50 records, in the nonvolatile memory 56, the filtering reproduction condition instructed to be changed at step S306.

Figure 4:
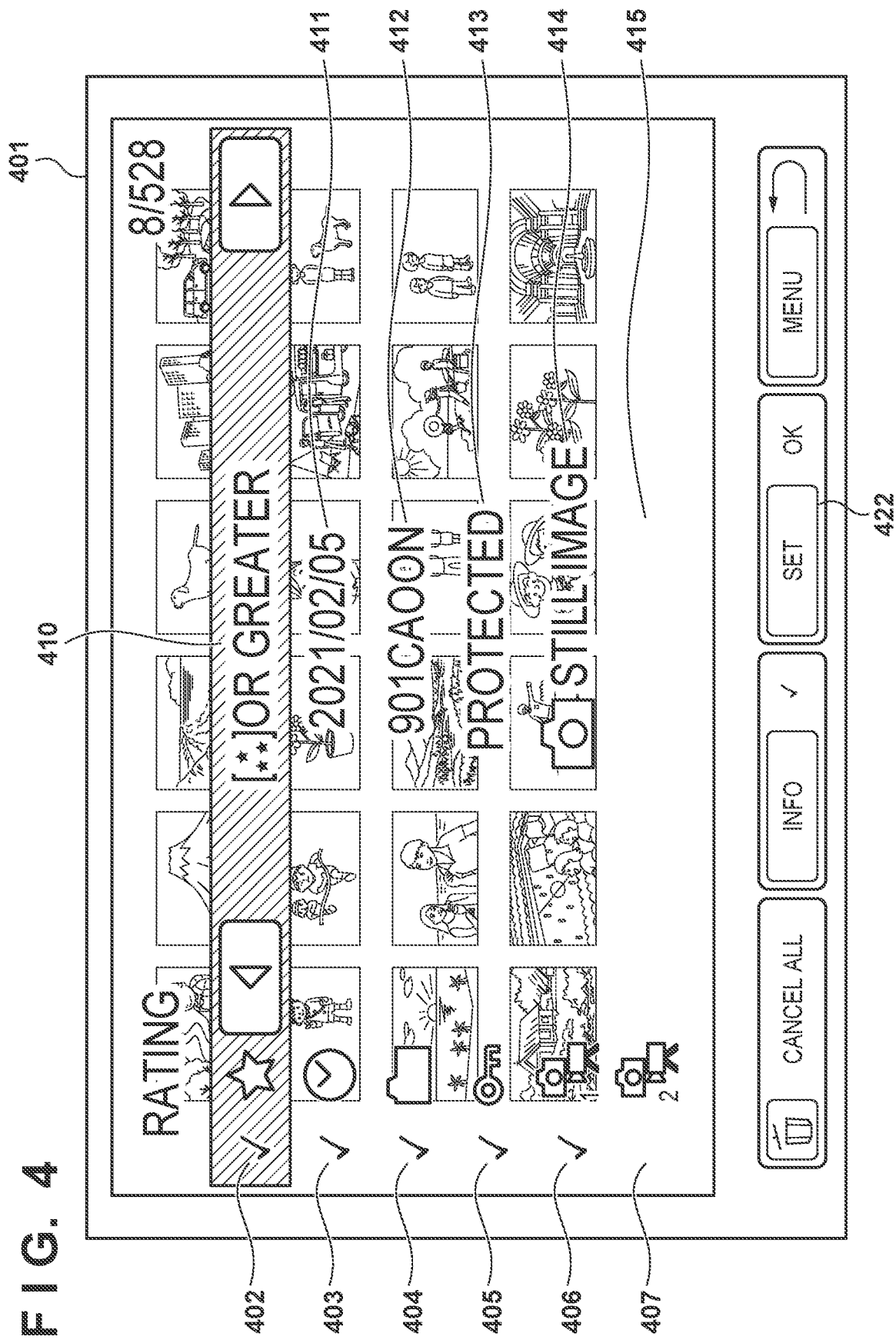
FIG. 4 is a diagram illustrating an example of a setting screen of filtering reproduction condition in an embodiment.

FIG. 4 is a diagram illustrating an example of the setting screen of the filtering reproduction condition displayed on the display unit 28, according to the present embodiment. The setting screen allows for setting, as a filtering reproduction condition, attribute information 415 of image data and image data recording location, such as rating 410, image captured date 411, image data storage folder 412 in the recording medium 200, protected/unprotected 413, still image/video 414. In addition, it is possible to set whether or not to enable those attribute information as filtering reproduction condition by providing check marks 402 to 407. Additionally, selecting the SET button 422 allows the user to record the contents set at the setting screen in the nonvolatile memory 56. Here, the filtering reproduction condition may be other than the attribute information listed above.

At step S308, the system control unit 50 determines whether or not the operation unit 70 has instructed to change the filtering reproduction mode setting. When the filtering reproduction mode setting is instructed to be changed, the system control unit 50 advances the process to step S309, and when the filtering reproduction mode setting is not instructed to be changed, the system control unit advances the process to step S311.

At step S309, the system control unit 50 changes the setting of the filtering reproduction mode recorded in the memory 32 to ON.

At step S310, the system control unit 50 acquires, from the system timer 53, the clock time at which the filtering reproduction mode is changed to ON, and records the clock time in the memory 32.

At step S311, the system control unit 50 determines whether or not the shutter release button 61 is full-pressed, whereby the second shutter switch 64 is turned ON and the second shutter switch signal SW2 is generated (whether or not an image capturing instruction is performed). When the second shutter switch signal SW2 is generated, the system control unit 50 advances the process to step S312, or when the second shutter switch signal SW2 is not generated, the system control unit 50 advances the process to step S313.

At step S312, the system control unit 50 executes a sequence of operations of image capturing processing from reading a signal from the image capturing unit 22 to writing image data to the recording medium 200.

At step S313, the system control unit 50 determines whether or not the operation unit 70 has instructed execution of image editing. When image editing is instructed to be performed, the system control unit 50 advances the process to step S314, and when the image editing is not instructed to be performed, the system control unit 50 advances the process to step S315.

At step S314, the system control unit 50 performs a sequence of operations of image editing processing, on the image data of the recording medium 200, that applies, by the image processing unit 24, image editing, such as image resizing processing and color conversion processing, and writes the newly edited image data to the recording medium 200.

At step S315, the system control unit 50 determines whether or not image receiving has been instructed. When image receiving is instructed, the system control unit 50 advances the process to step S316, or when the image receiving is not instructed, the system control unit 50 advances the process to step S317.

At step S316, the system control unit 50 performs a sequence of operations of image receiving that writes the image data received by the communication unit 54 to the recording medium 200.

At step S317, the system control unit 50 determines whether or not the operation unit 70 has instructed to start the reproduction mode. When the reproduction mode is instructed to start, the system control unit 50 advances the process to step S318, or when the reproduction mode is not instructed to start, the system control unit 50 terminates the process of the flowchart.

At step S318, the system control unit 50 starts the reproduction mode.

At step S319, the system control unit 50 determines whether or not the filtering reproduction mode setting recorded in the memory 32 is ON. When the filtering reproduction mode setting is ON, the system control unit 50 advances the process to step S320, or when the filtering reproduction mode setting is not ON, the system control unit 50 advances the process to step S323.

At step S320, the system control unit 50 acquires, from the memory 32, the clock time of termination of the prior reproduction mode recorded at step S305 and the clock time of the turning ON of the filtering reproduction mode stored at step S310. Subsequently, the system control unit 50 determines whether or not any of the images added to the recording medium 200 after the later one of the aforementioned clock times (referred to as "image added later" in the following) does not satisfy the filtering reproduction condition set at step S307. Here, the image added later may include the image captured at step S311, the image edited at step S313, and the image received at step S315.

When any of the images added later does not satisfy the filtering reproduction condition, the system control unit 50 advances the process to step S321. Alternatively, the system control unit 50 advances the process to step S323 when none of the images added later satisfies the filtering reproduction condition. Here, the condition to be determined at step S320 may be whether or not all the images added later do not satisfy the filtering reproduction condition.

At step S321, the system control unit 50 displays guidance by text on the display unit 28 (performs display for calling the attention of the user) indicating that the image added later does not satisfy the filtering reproduction condition and is not displayed.

Figure 5:
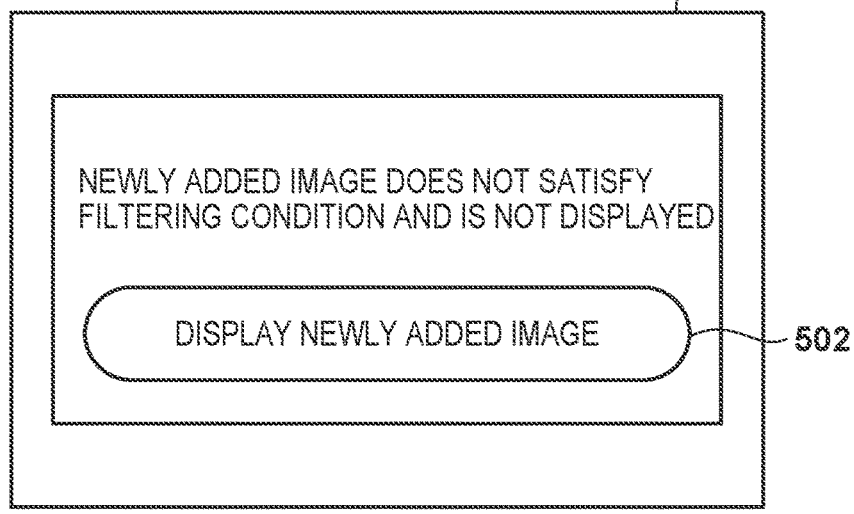
FIG. 5 is a diagram illustrating an example of guidance that calls for attention in an embodiment.

FIG. 5 is a diagram illustrating an example of a guidance screen indicating that the image added later does not satisfy the filtering reproduction condition and is not displayed. In the guidance screen 501, a button 502 configured to display a newly added image is displayed, and when the user selects this button, the system control unit 50 advances the process to step S322. In a case where it is not necessary to display the newly added image, after the user has checked the guidance screen 501, the user performs an operation by the operation unit 70 to terminate the guidance. In such a case, the system control unit 50 advances the process to step S323.

At step S322, the system control unit 50 displays an image newly added to the recording medium 200 on the display unit 28, as an outside-of-filtering reproduction process, described below, indicating such that the image can be identified to be different from those satisfying the filtering reproduction condition. Details of the outside-of-filtering reproduction processing will be described below, referring to FIG. 6.

At step S323, the system control unit 50 displays, on the display unit 28, the latest image data among the image data recorded in the recording medium 200 when the filtering reproduction mode is OFF. When, alternatively, the filtering reproduction mode is ON, the system control unit 50 displays, on the display unit 28, the latest image data that matches the filtering reproduction condition among the image data recorded in the recording medium 200.

At step S324, the system control unit 50 determines whether or not the operation unit 70 has instructed to terminate the reproduction mode. When the reproduction mode is instructed to terminate, the system control unit 50 advances the process to step S325, or when the reproduction mode is not instructed to terminate, the system control unit 50 keeps waiting.

At step S325, the system control unit 50 terminates the reproduction mode and terminates the operation of displaying, on the display unit 28, the image data recorded in the recording medium 200.

At step S326, the system control unit 50 acquires, from the system timer 53, the clock time at which the reproduction mode is terminated, records the clock time in the memory 32, and terminates the operation of the flowchart.

Figure 6:
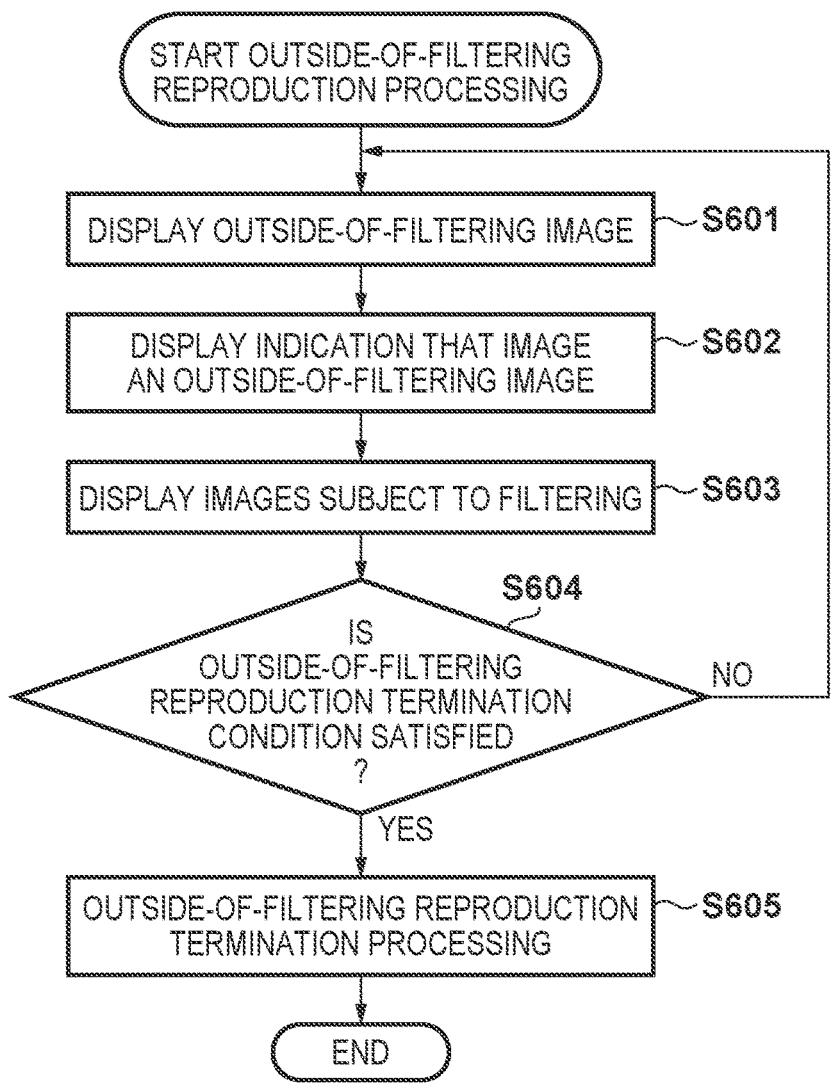
FIG. 6 is a flowchart illustrating a procedure of an outside-of-filtering reproduction process.
Figure 7:
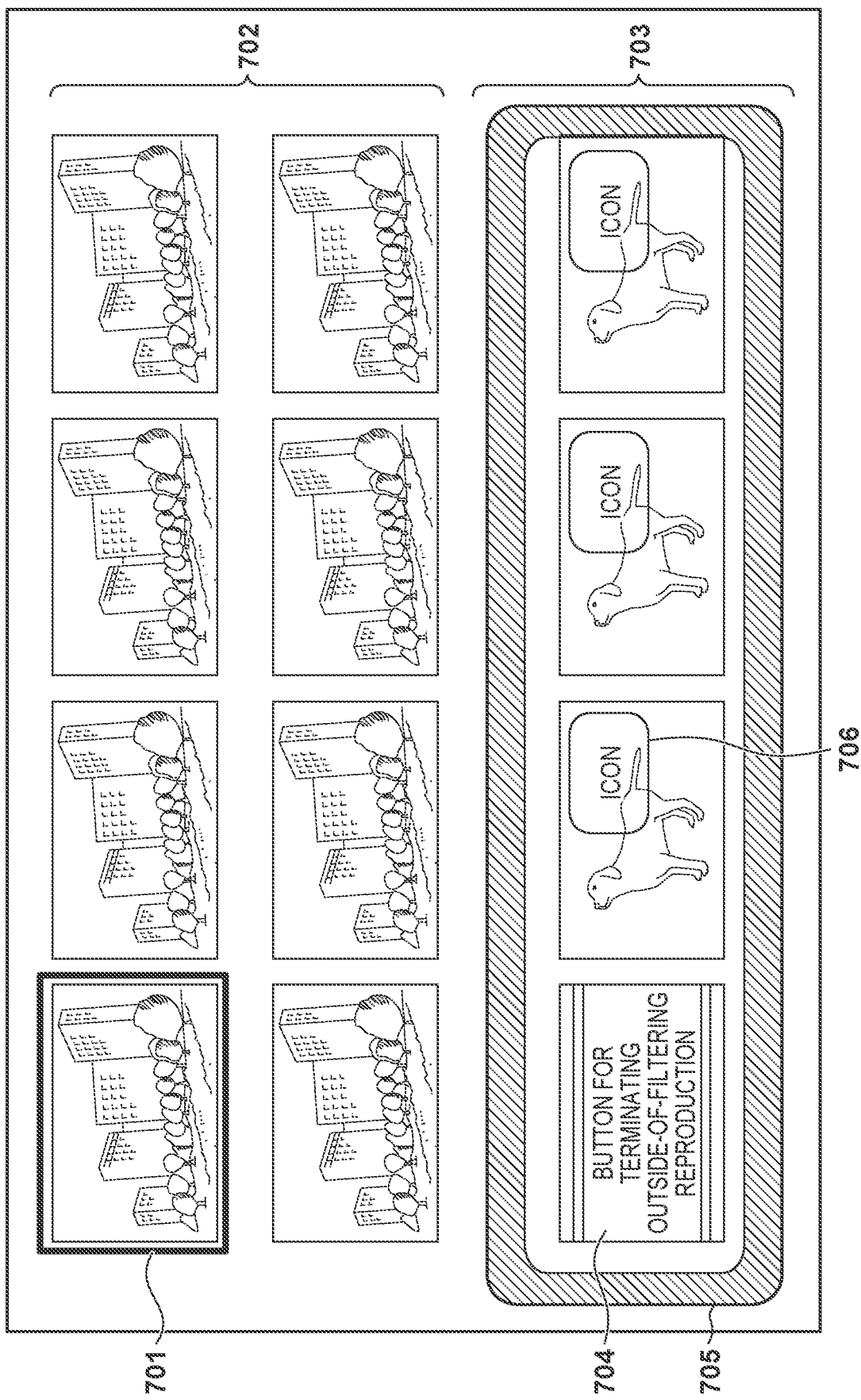
FIG. 7 is a diagram illustrating an example of a display screen for the outside-of-filtering reproduction processing.

In the following, the outside-of-filtering reproduction processing, which is a detailed processing at step S322 of FIG. 3, will be described referring to FIGS. 6 and 7. FIG. 6 is a flowchart illustrating the procedure of the outside-of-filtering reproduction processing according to the present embodiment. FIG. 7 is a diagram illustrating an example of a screen displayed during the outside-of-filtering reproduction processing. An image selection frame 701 is a selection frame indicating a currently selected image, the position of the image selection frame can be changed by using the direction buttons on the operation unit 70 or by a touch operation.

At step S601, the system control unit 50 acquires the termination clock time of the reproduction mode recorded at step S305 and the starting clock time of the filtering reproduction mode recorded at step S310. Subsequently, the system control unit 50 displays, on the display unit 28, the image that does not satisfy the filtering reproduction condition set at step S307 among the images added after the later one of the aforementioned clock times (referred to as "outside-of-filtering image" in the following). The outside-of-filtering images 703 illustrated in FIG. 7 are an exemplary outside-of-filtering group of images displayed at step S601.

At step S602, the system control unit 50 displays an object on the images displayed on the display unit 28 at step S601 to emphasize (distinguish) that they are the outside-of-filtering images. In this way, it becomes easier to visually understand that the images are different from those satisfying the filtering reproduction condition displayed at step S603. An example of an object displayed for emphasis is illustrated in FIG. 7. An image emphasis frame 705 is displayed by enclosing only the outside-of-filtering images at step S602, and can be transparently colored together with the interior thereof. In addition, a dedicated icon 706 is displayed only on the outside-of-filtering images to indicate that they are the outside-of-filtering images at step S601. At least one of processes emphasizing to be the outside-of-filtering images is performed.

At step S603, the system control unit 50 displays, on the display unit 28 in a prioritized manner, the latest image data that matches the filtering reproduction condition among the image data recorded in the recording medium 200. A group of displayed images 702 that matches the filtering reproduction condition illustrated in FIG. 7 is an exemplary group of images displayed at step S603. The images displayed at step S603 are displayed preferentially from the latest image data. Images that cannot be displayed on a page are not displayed on that page but can be displayed by scrolling the images or changing the number of images displayed on a page.

At step S604, the system control unit 50 determines whether or not the condition of terminating the outside-of-filtering reproduction operation is satisfied. When the condition of termination is satisfied, the system control unit 50 advances the process to step S605, or when the condition of termination is not satisfied, the system control unit 50 returns the process to step S601. The condition of terminating the outside-of-filtering reproduction is satisfied by selecting the termination button displayed on the display unit 28.

Here, the condition of terminating the outside-of-filtering reproduction may also be satisfied by processing such as changing the filtering reproduction condition as performed at step S306, turning off the power supply to the camera, removing the recording medium 200, changing the prioritized recording medium 200.

At step S605, the system control unit 50 terminates the outside-of-filtering reproduction and terminates display of the image displayed at step S601 among the image data being displayed on the display unit 28.

Here, the button configured to terminate the outside-of-filtering reproduction processing at step S604 is displayed on the display unit 28 as an outside-of-filtering reproduction termination button 704 as illustrated in FIG. 7, for example.

The outside-of-filtering reproduction termination button 704 is displayed at an image position midway between the group of displayed images 702 satisfying the filtering reproduction condition and the outside-of-filtering group of images 703, for example. Accordingly, it becomes easier to distinguish the boundary between the outside-of-filtering group of images 703 displayed at step S601 and the group of displayed images 702 satisfying the filtering reproduction condition displayed at step S603.

Alternatively, the arrangement position of the outside-of-filtering reproduction termination button 704 may be the position of the first image (start position) or the position of the end point image (end position) of the outside-of-filtering group of images 703. Furthermore, when there exists a space which is not overlapping with a displayed object on the screen and the button can be displayed, it is also possible to display the outside-of-filtering reproduction termination button 704 at this space. Accordingly, the foregoing increases the degree of freedom in displaying images. The outside-of-filtering reproduction termination button 704 is placed on one of such arrangement positions.

As has been described above, according to the present embodiment, the enabled state of the filtering reproduction mode can continue even when an image is newly added while the filtering reproduction mode is enabled, and the user can check the outside-of-filtering images with continuing the filtering reproduction state, even when the added image does not satisfy the filtering reproduction condition.

Although the aforementioned embodiment has been described taking as an example a case of applying the present invention to the digital camera 100, the present invention is not limited to such an example and can be applied to any image reproduction apparatus that can capture an image or add an image. In other words, the present invention can be applied to cell phone terminals or portable image viewers that can capture an image or add an image, printer apparatuses including a viewfinder, digital photo frames, music players, game consoles, e-book readers, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-090383, filed Jun. 2, 2022, Japanese Patent Application No. 2022-092394, filed Jun. 7, 2022, which are hereby incorporated by reference herein in their entirety.

What is claimed is:

1. An image reproduction apparatus comprising:
at least one processor or circuit configured to function as
a setting unit configured to set, when reproduction of an image stored in a storage unit is performed, whether to perform filtering reproduction that reproduces the image by performing filtering in which only images that match specific attribute information are selected, or to perform reproduction without performing filtering; and
a control unit configured to control reproduction of images stored in the storage unit based on the setting by the setting unit, wherein
the control unit performs display for calling the attention of a user when an image that does not match the specific attribute information is included in images being added to the storage unit before performing the filtering reproduction.

2. The image reproduction apparatus according to claim 1, wherein the image being added is an image that is added to the storage unit after the setting unit has set the setting to perform the filtering reproduction.

3. The image reproduction apparatus according to claim 1, wherein the image being added is an image that is added to the storage unit after a clock time at which reproduction was previously terminated.

4. The image reproduction apparatus according to claim 1, wherein the setting unit sets whether to perform the filtering reproduction or to perform reproduction without performing the filtering, in accordance with an instruction from a user.

5. The image reproduction apparatus according to claim 1, wherein the at least one processor or circuit is configured to further function as a second setting unit configured to set a condition for the filtering reproduction.

6. The image reproduction apparatus according to claim 1, wherein the display for calling for attention is guidance by text.

7. The image reproduction apparatus according to claim 1, further comprising an image capturing device configured to capture images, wherein the image being added is an image captured by the image capturing device.

8. The image reproduction apparatus according to claim 1, wherein the control unit performs the display for calling for attention when at least one of the images being added is an image that does not match the specific attribute information.

9. The image reproduction apparatus according to claim 1, wherein the control unit performs the display for calling for attention when all the images being added are images that do not match the specific attribute information.

10. The image reproduction apparatus according to claim 1, wherein, when an image that does not match the specific attribute information is included in the images being added to the storage unit before the filtering reproduction is performed, the control unit controls to display the image that is included in the images being added and does not match the specific attribute information.

11. The image reproduction apparatus according to claim 10, wherein the at least one processor or circuit is configured to further function as an editing unit configured to edit an image, wherein the image being added is an image edited by the editing unit.

12. The image reproduction apparatus according to claim 10, wherein the at least one processor or circuit is configured to further function as a receiving unit configured to receive an image, wherein the image being added is an image received by the receiving unit.

13. The image reproduction apparatus according to claim 10, wherein, when at least one of the images being added is an image that does not match the specific attribute information, the control unit controls to display the image that is included in the images being added and does not match the specific attribute information.

14. The image reproduction apparatus according to claim 10, wherein the control unit displays such that an image that matches the specific attribute information and an image that does not match the specific attribute information can be distinguished.

15. The image reproduction apparatus of according to claim 10, wherein the control unit terminates the operation of displaying the image that does not match the specific attribute information in case one of changing the filtering condition, turning off power supply to the image reproduction apparatus, and removing the storage unit is performed.

16. The image reproduction apparatus according to claim 10, wherein the control unit displays a button configured to terminate the operation of displaying the image that does not match the specific attribute information at one of a position between the image that matches the specific attribute information and the image that does not match the specific attribute information, a start position or an end position of the image that does not match the specific attribute information, and a position that does not overlap with a displayed object on a screen.

17. The image reproduction apparatus according to claim 10, wherein, when an image that does not match the specific attribute information is included in the images being added to the storage unit before the filtering reproduction is performed, the control unit performs display for calling the attention of the user before displaying the image that does not match the specific attribute information.

18. The image reproduction apparatus according to claim 17, wherein the control unit displays a button configured to select whether or not to display an image that does not match the specific attribute information in the display for calling the attention of the user.

19. A method for controlling an image reproduction apparatus including a setting unit configured to set, when reproduction of an image stored in a storage device is performed, whether to perform filtering reproduction that reproduces the image by performing filtering in which only images that match specific attribute information are selected, or to perform reproduction without performing filtering, the method comprising:
controlling reproduction of an image stored in the storage device based on the setting set by the setting unit, wherein
the controlling performs display for calling the attention of a user when an image that does not match the specific attribute information is included in images being added to the storage unit before the filtering reproduction is performed.

20. The method for controlling an image reproduction apparatus according to claim 19, wherein, when an image that does not match the specific attribute information is included in images being added to the storage device before the filtering reproduction is performed, the method controls to display the image that is included in the images being added and does not match the specific attribute information.

21. A non-transitory computer-readable storage medium storing a program for causing a computer to function as respective units of the image reproduction apparatus, the image reproduction apparatus comprising:
a setting unit configured to set, when reproduction of an image stored in a storage unit is performed, whether to perform filtering reproduction that reproduces the image by performing filtering in which only images that match specific attribute information are selected, or to perform reproduction without performing filtering; and
a control unit configured to control reproduction of images stored in the storage unit based on the setting by the setting unit, wherein
the control unit performs display for calling the attention of a user when an image that does not match the specific attribute information is included in images being added to the storage unit before performing the filtering reproduction.

* * * * *